(12) United States Patent
Oliveira et al.

(10) Patent No.: US 8,828,142 B2
(45) Date of Patent: Sep. 9, 2014

(54) PROCESSES FOR EXTRACTION OF SUGAR FROM SUGAR-BEARING PLANT MATERIAL

(71) Applicants: Abel Oliveira, Sao Paulo (BR); Yuri Alencar, Botucatu (BR)

(72) Inventors: Abel Oliveira, Sao Paulo (BR); Yuri Alencar, Botucatu (BR)

(73) Assignee: Dow Brasil Sudeste Industrial LTDA., Sao Paulo (BR)

( * ) Notice: Subject to any disclaimer, the term of this patent is extended or adjusted under 35 U.S.C. 154(b) by 0 days.

(21) Appl. No.: 13/826,263

(22) Filed: Mar. 14, 2013

(65) Prior Publication Data

US 2013/0267001 A1    Oct. 10, 2013

Related U.S. Application Data

(63) Continuation of application No. 12/935,255, filed as application No. PCT/BR2009/000096 on Apr. 9, 2009, now abandoned.

(60) Provisional application No. 61/044,120, filed on Apr. 11, 2008.

(51) Int. Cl.

| C13B 10/14 | (2011.01) |
| C13B 10/00 | (2011.01) |
| C13B 10/04 | (2011.01) |
| C13B 50/00 | (2011.01) |
| C13B 5/02 | (2011.01) |
| C13K 13/00 | (2006.01) |
| C13B 35/02 | (2011.01) |
| C13B 5/04 | (2011.01) |
| C13B 10/02 | (2011.01) |

(52) U.S. Cl.
CPC ............... *C13K 13/007* (2013.01); *C13B 5/02* (2013.01); *A23V 2002/00* (2013.01); *Y02E 50/17* (2013.01); *C13B 35/02* (2013.01); *C13B 5/04* (2013.01); *C13B 10/003* (2013.01); *C13B 10/025* (2013.01)
USPC .................................. 127/44; 127/42; 127/43

(58) Field of Classification Search
CPC ...... C13B 10/14; C13B 50/00; C13B 10/003; C13B 10/04
See application file for complete search history.

(56) References Cited

U.S. PATENT DOCUMENTS

| 1,876,522 A | 9/1932 | Vazquez |
| 2,217,598 A | 10/1940 | Roberts et al. |

(Continued)

FOREIGN PATENT DOCUMENTS

| EP | 0 456 627 A2 | 11/1991 |
| FR | 2543573 A | 10/1984 |

(Continued)

OTHER PUBLICATIONS

Domino Sugar "Which is Less Fattening" Life Magazine, Apr. 20 1953, p. 116.*

(Continued)

*Primary Examiner* — Jon P Weber
*Assistant Examiner* — Charles Zoltan Constantine
(74) *Attorney, Agent, or Firm* — McDonnell Boehnen Hulbert & Berghoff LLP

(57) ABSTRACT

The invention provides processes for the extraction of sugar from sugar-bearing plant material such as sugar cane. Accordingly, in one aspect of the invention, a process for extracting sugar from sugar-bearing plant material comprises contacting the sugar-bearing plant material with an extractant solution comprising water and a surfactant; and separating the extractant solution from the sugar-bearing plant material. One example of a suitable surfactant is a poly(alkylene oxide) polymer such as a poly(propylene oxide) polymer, a poly(ethylene oxide) polymer, or a poly(propylene oxide)/(ethylene oxide) copolymer.

18 Claims, 2 Drawing Sheets

(56) References Cited

U.S. PATENT DOCUMENTS

| | | | |
|---|---|---|---|
| 2,307,326 A | | 1/1943 | Lissauer et al. |
| 2,431,634 A | | 11/1947 | Diaz-Compain |
| 2,482,750 A | | 9/1949 | Erickson et al. |
| 2,727,009 A | | 12/1955 | Jursich |
| 2,943,004 A | | 6/1960 | Haury |
| 3,424,611 A | | 1/1969 | Miller |
| 3,424,612 A | | 1/1969 | Miller |
| 3,637,869 A | * | 1/1972 | Seizinger ............... 568/624 |
| 3,695,931 A | | 10/1972 | Hamill |
| 3,874,925 A | | 4/1975 | Loncin |
| 3,990,905 A | | 11/1976 | Wachala et al. |
| 4,310,361 A | | 1/1982 | Georget |
| 4,978,686 A | | 12/1990 | Sotome |
| 5,725,815 A | * | 3/1998 | Wollenweber et al. ......... 264/41 |
| 5,885,359 A | | 3/1999 | Tosio |
| 6,916,381 B2 | | 7/2005 | Granguillhome et al. |
| 7,001,634 B2 | * | 2/2006 | Browne ............... 426/329 |
| 7,192,524 B2 | | 3/2007 | Almagro |
| 2009/0203076 A1 | | 8/2009 | Kabanov et al. |

FOREIGN PATENT DOCUMENTS

| | | |
|---|---|---|
| GB | 1371731 A * | 4/1986 |
| PL | 149376 B1 * | 3/1990 |
| WO | WO 9803243 A1 * | 1/1998 |
| WO | 01/14595 A2 | 3/2001 |
| WO | 2008/029163 A2 | 3/2008 |
| WO | 2008/106696 A2 | 9/2008 |

OTHER PUBLICATIONS

Blease "Surfactant Antifoams" Chapter 8, 299-323, Defoaming, edited by P.R. Garrett, Marcel Dekker New York, 1993.*

PCT/BR2009/000096 International Search Report, mailed Jul. 24, 2009.

PCT/BR2009/000096 Written Opinion of the International Searching Authority, Oct. 11, 2010.

BASF-Product Information the Chemicals Catalog-Pluronic ("Pluronic" BASF, Brands, available at worldaccount.basf.com/wa/NAFTA/Catalog/ChemicalsNAFTA/pi/BASF/Brand/pluronic), Aug. 7, 2012.

Technical Bulletin, Pluronic F68, Block Copolymer Surfactant, BASF, 2004.

Technical Bulletin, Pluronic L62, Block Copolymer Surfactant, BASF, 2004.

Technical Bulletin, Pluronic L101, Block Copolymer Surfactant, BASF, 2004.

Technical Bulletin, Pluronic L92, Block Copolymer Surfactant, BASF, 2004.

Roberto A. Echemendia, Energy Saving by optimizing imbibition, Int. Sug. Jnl., 1989, vol. 91, No. 1089.

* cited by examiner

PROCESSES FOR EXTRACTION OF SUGAR FROM SUGAR-BEARING PLANT MATERIAL

CROSS-REFERENCE TO RELATED APPLICATIONS

This application is a continuation application of U.S. patent application Ser. No. 12/935,255, filed Sep. 28, 2010, which is a national stage entry of PCT/BR2009/000096, filed Apr. 9, 2009, which claims priority to U.S. Provisional Application No. 61/044,120, filed Apr. 11, 2008, all of which are hereby incorporated herein by reference in their entireties.

BACKGROUND OF THE INVENTION

1. Field of the Invention

The invention relates generally to sugar production. The invention relates more particularly to processes for extracting sugar from sugar-bearing plant material.

2. Technical Background

Sugar is an important product, as it is used not only as a foodstuff but also as a raw material for the production of ethanol. Sugar is produced industrially by the extraction and purification of sugar from sugar-bearing plant materials. A variety of plants bear sugar. Currently, the industrially most important sugar-bearing plant is sugar cane. Sugar cane is a member of the *Saccharum* genus, which in turn is part of the grass family. It has a high agricultural yield and a high sugar content, and can be processed with relative ease. Sugar cane juice has as its chief sugars the disaccharide sucrose and its component monosaccharides fructose and glucose. Of course, other plant materials, such as sugar beets, are also used to produce sugar. Much effort has been expended in increasing sugar production, for example by increasing crop yields, increasing the sugar content of sugar-bearing plants, and increasing the extraction of sugar from the sugar-bearing plants.

In most commercial sugar operations, sugar is released from sugar-bearing plant material through a physical process. For example, in one typical process for extracting sucrose and other sugars from sugar cane, the sugar cane is chopped, and ground and pressed several times to extract the juice. Imbibition water (e.g., provided as water or dilute cane juice) can be added in one or more of these milling steps to rinse additional sugar from the milled sugar cane material. Liquids are collected, concentrated and treated to remove impurities, thereby forming a mixture of sugars having sucrose as its chief component. Pure sucrose can be isolated by crystallization.

The milling process generally yields sugar extraction in the range of 92-94%, with the rest of the sugar remaining entrapped in the fibers of the cane plant material. While extractions in the low-90 percent range are rather high, even higher extractions could relate directly to reduced waste and higher profitability. Accordingly, one focus of engineering efforts has been to attempt to squeeze the last few percent of the sugar from the milled sugar cane material. A variety of complex milling processes have been developed to more efficiently break up the sugar cane material, thereby allowing the juice to flow more freely therefrom. However, these processes can often require equipment that is expensive and difficult to maintain, and still do not achieve maximal extraction. The use of alkaline and highly alcoholic extractant solutions as well as steam have also been suggested. These processes can be severely limited by cost and purification concerns.

In so-called diffusion processes, shredded sugar cane material is repeatedly washed with hot water, often under pressure. Diffusion processes suffer from many of the same shortcomings as do milling processes: insufficiently high extraction, equipment intensivity, and cost and purification concerns.

Accordingly, there remains a need for new processes for the extraction of sugar from sugar-bearing plant materials with high extraction efficiency.

SUMMARY OF THE INVENTION

One aspect of the invention is a process for extracting sugar from sugar-bearing plant material, the process comprising:
  contacting the sugar-bearing plant material with an extractant solution comprising water and a surfactant; and
  separating the extractant solution from the sugar-bearing plant material.

Another aspect of the invention is a process for making a sugar product from a sugar-bearing plant material, the process comprising:
  contacting the sugar-bearing plant material with an extractant solution comprising water and a surfactant;
  separating the extractant solution from the sugar-bearing plant material; and
  processing and refining the extractant solution to form the sugar product.

Another aspect of the invention is a process for making ethanol from a sugar-bearing plant material, the process comprising:
  contacting the sugar-bearing plant material with an extractant solution comprising water and a surfactant;
  separating the extractant solution from the sugar-bearing plant material;
  processing and fermenting the sugar-bearing extractant solution to form an aqueous ethanol solution; and
  isolating the ethanol from the aqueous ethanol solution.

The invention is capable of providing a number of advantages over the art. For example, the invention can provide percentage point increases in the extraction of sugar from sugar bearing plant materials in a cost-effective fashion. Moreover, the invention can be used as part of existing processes, as it does not require the use of any additional machinery. Additional features and advantages of the invention will be set forth in the detailed description which follows and will be readily apparent to those skilled in the art from the description or recognized by practicing the invention as described in the written description and claims hereof, as well as in the appended drawings.

It is to be understood that both the foregoing general description and the following detailed description are merely exemplary of the invention, and are intended to provide an overview or framework for understanding the nature and character of the invention as it is claimed.

DETAILED DESCRIPTION OF THE INVENTION

One aspect of the invention is a process for extracting sugar from sugar-bearing plant material. The process comprises contacting the sugar-bearing plant material with an extractant solution comprising water and a surfactant; and separating the extractant solution from the sugar-bearing plant material.

For example, in one embodiment of the invention the extractant solution consists essentially of water, surfactant, optionally a solvent (as described below), and optionally sugar-bearing plant material juice. The sugar-bearing plant material juice can come from, for example, an earlier extraction step or an earlier milling step.

In one embodiment of the invention, the sugar-bearing plant material is sugar cane material. As will be described in more detail below, the sugar cane material can be sugar cane bagasse, the ground up sugar cane material that is the solid output of a milling step. For example, in multi-step milling processes, sugar cane material can be milled and pressed to extract concentrated juice and produce bagasse, which can then be contacted with the extractant solution in a subsequent step, as will be described more fully below. While the invention will be described with particular reference to sugar cane and sugar cane milling processes, the person of skill in the art will recognize that the invention can be practiced with other sugar-bearing plant materials such as sugar beets, and with other sugar extraction processes such as diffusion processes.

In one embodiment of the invention, the sugar-bearing plant material is ground, milled, chopped, pulped, shredded or macerated before being contacted with the extractant solution. Such physical processing steps can be advantageous in that they expose more of the plant surface to the extractant solution, and can break the plant cell walls in order to free the cell contents. In other embodiments of the invention, the sugar-bearing plant material is ground, milled, chopped, pulped, shredded or macerated while it is being contacted with the extractant solution. In still other embodiments of the invention, the sugar-bearing plant material is ground, milled, chopped, pulped, shredded or macerated both before and while it is being contacted with the extractant solution. For example, in one embodiment of the invention, the sugar-bearing plant material is shredded before being contacted with the extractant solution, then milled as it is being contacted with the extractant solution. In another embodiment of the invention, the sugar-bearing plant material is first milled one or more times with imbibition water; then milled one or more times in contact with extractant solution.

Figure 1:
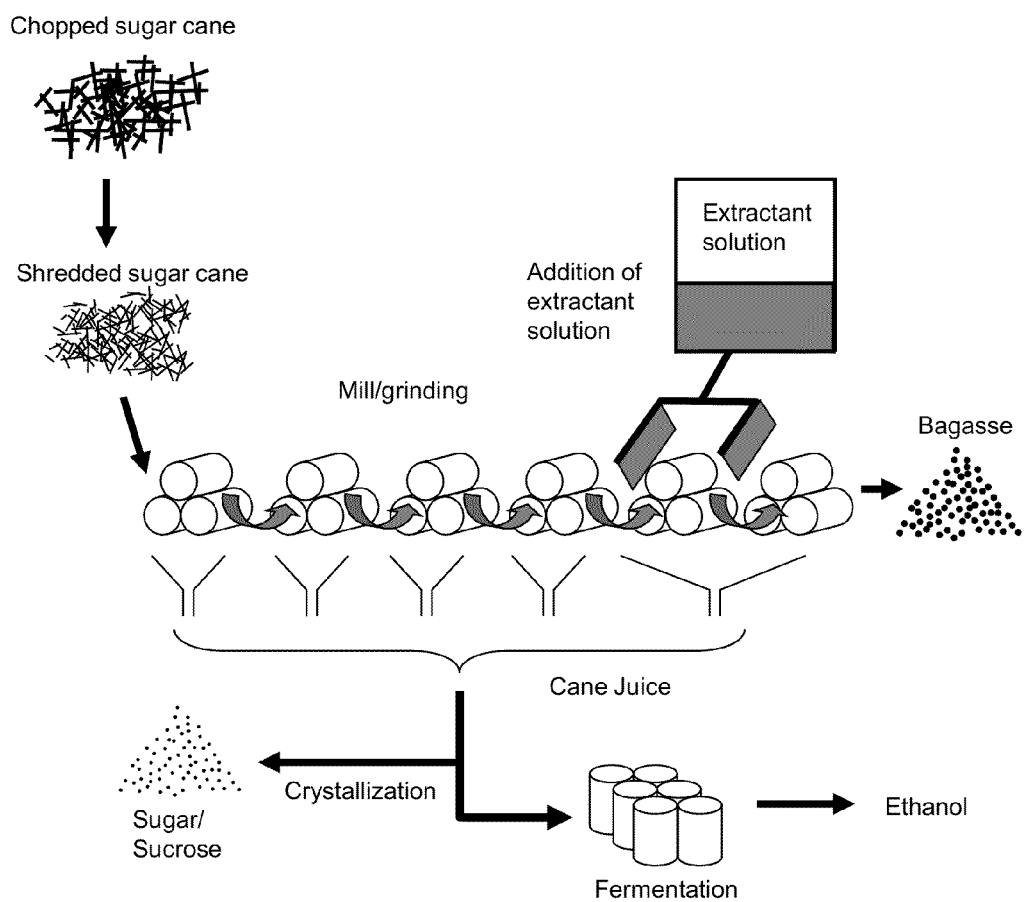
FIG. 1. is a schematic view of an extraction process according to one embodiment of the invention.

An example of a process according to the invention is shown in schematic view in FIG. 1. Clean sugar cane is first cut and/or shredded into small pieces, for example by using revolving knives and/or shredders, in order to break up the hard structure of the cane. The sugar cane material is then passed through a series of mills. Each mill grinds the sugar cane material and squeezes out sugar-containing liquid, which is collected for further processing. The mills can be, for example, three-roller mills (often called "grinding terns"). The extractant solution can be added in any one or more of the individual milling steps. For example, in the embodiment shown in FIG. 1, extractant solution is added before the fifth and sixth milling steps. As will be described in more detail below, use of an extractant solution including a surfactant can result in increased sugar extraction over that achieved through the use of imbibition water (e.g., water or dilute cane juice) alone. The collected liquids can be, for example, refined to form sucrose, or fermented to form ethanol. The residual solid bagasse material can be subject to further extraction, or alternatively used as fertilizer, combustion fuel, or in a number of other industrial processes.

In other processes of the invention, the sugar-bearing plant material is contacted with the extractant solution in a diffusion process. Diffusion processes are described, for example, in U.S. Pat. No. 5,885,359, which is hereby incorporated herein by reference in its entirety.

In certain embodiments of the invention, the surfactant is present in the extractant solution at a concentration in the range of about 0.2 ppm to about 1000 ppm based on the mass of the extractant solution. That is, the relative amounts of surfactant and extractant solution satisfy the following relation:

$$\text{about } 0.2 \; ppm \leq \frac{\text{Mass of surfactant}}{\text{Mass of extractant solution}} \leq \text{about } 1000 \; ppm$$

In other embodiments of the invention, the surfactant is present in the extractant solution at a concentration in the range of about 0.5 ppm to about 500 ppm based on the mass of the extractant solution. For example, the surfactant can be present in the range of about 1 ppm to about 200 ppm, in the range of about 2 ppm to about 100 ppm, or even in the range of about 3 ppm to about 50 ppm based on the mass of the extractant solution.

In one embodiment of the invention, the weight ratio of extractant solution to sugar-bearing plant material is in the range of about 0.05:1 to about 20:1. In another embodiment of the invention, the weight ratio of extractant solution to sugar-bearing plant material is in the range of about 0.1:1 to about 10:1. In yet another embodiment of the invention, the weight ratio of extractant solution to sugar-bearing plant material is in the range of 0.2:1 to about 5:1.

A wide variety of surfactants can be used in the practice of the invention. For example, in one embodiment of the invention, the surfactant is a nonionic surfactant. In another embodiment of the invention, poly(alkylene oxide) surfactants are preferred.

In one aspect of the invention, the surfactant is a poly(alkylene oxide) polymer. For example, the surfactant can be a poly(propylene oxide) polymer, a poly(ethylene oxide) polymer, or a poly(propylene oxide)/(ethylene oxide) random or block copolymer. The surfactant can have, for example, a number average molecular weight of at least about 1500 g/mol, or even at least about 3000 g/mol. The surfactant can have, for example, a functionality of at least about 1.5, and preferably no more than about 3.0. In certain embodiments of the invention, the surfactant has ethylene oxide units (i.e., —(CH$_2$CH$_2$O)— units) in the range of about 5 wt % to about 85 wt %. For example, the surfactant can have ethylene oxide units in the range of about 10 wt % to about 40 wt % (e.g., about 20 wt %).

In one embodiment of the invention, the poly(alkylene oxide) polymer surfactant is an poly(propylene oxide)/poly(ethylene oxide) block copolymer of the formula (I):

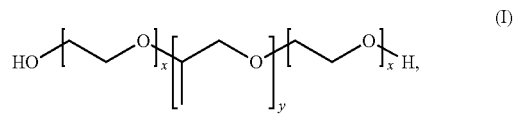

in which each of x and y are greater than zero (e.g., each x and y individually in the range of about 0.5 to 2000, preferably in the range of 1 to 1000). The person of skill can select x and y values to give the polymer a desired content of ethylene oxide units and molecular weight.

The block copolymer of formula (I) can have, for example, ethylene oxide units in the range of about 5 wt % to about 85 wt %. In certain embodiments of the invention, the block copolymer has ethylene oxide units in the range of about 10 to about 40 wt %. For example, the content of ethylene oxide units can be about 20 wt %.

In one embodiment of the invention, the surfactant is a poly(ethylene oxide)-capped poly(propylene glycol) block copolymer having an average molecular weight in the range of about 1500 g/mol to about 10000 g/mol; an average functionality (i.e., of OH capping groups) in the range of about 1.5 to about 3 (e.g., difunctional or trifunctional); and an average content of ethylene oxide units in the range of about 10 wt % to about 40 wt %.

In one embodiment of the invention, the surfactant is an α-Hydro-omega-hydroxy-poly(oxyethylene)/poly(oxypropylene) (minimum 15 moles)/poly(oxyethylene) block copolymer, having a minimum average molecular weight of 1900 g/mol and a minimum cloud point of 9° C.-12° C. in 10 percent aqueous solution, as defined by 21 C.F.R. §172.808 (2008), which is incorporated herein by reference in its entirety.

One particular surfactant suitable for use in the invention is a block copolymer of structural formula (I) having an average molecular weight in the range of about 3800 g/mol to about 4200 g/mol and about 20 wt % ethylene oxide units (referenced herein as a "Nonionic Surfactant PO/EO Block Copolymer Having 20% EO Capping").

As the person of skill will appreciate, other surfactants can be used in the practice of the invention. For example, poly(butylene oxide)-based surfactants, such as poly(alkylene oxide)-capped poly(butylene oxide)s, poly(butylene oxide)-capped poly(alkylene oxides), and poly(butylene oxide)s can be used in the present invention.

Moreover, combinations of surfactants or co-surfactants can be used in the practice of the invention. For example, two poly(alkylene oxide) polymer surfactants can be used in combination. In another embodiment, a poly(alkylene oxide) and another nonionic surfactant are used in combination.

The sugar-bearing plant material can be contacted with the extractant solution in any convenient manner. For example, the extractant solution can be premixed (e.g., by adding pure surfactant or a concentrated surfactant solution to imbibition water), then added to the sugar-bearing plant material to achieve the desired target concentration (e.g., 0.5 ppm-500 ppm). In other embodiments of the invention, pure surfactant or a concentrated surfactant solution can be added to the sugar-bearing plant material separately from the imbibition water.

When using certain surfactants, for example certain poly(ethylene oxide)-capped poly(alkylene oxide) polymer surfactants such as a Nonionic Surfactant PO/EO Block Copolymer Having 20% EO Capping, dispersability in aqueous media can become a concern. As an example, the solubility of a Nonionic Surfactant PO/EO Block Copolymer Having 20% EO Capping can be somewhat limited in water; when it is added to water in concentrated form, it initially forms a gel. Accordingly, in certain embodiments of the invention, the surfactant is added to imbibition water as a concentrated surfactant solution including a solvent. The solvent can be, for example, an organic solvent such as an alcohol solvent, an ethereal solvent, an ester solvent or a ketone solvent. For example, in one embodiment of the invention, the extractant solution is formed by combining with imbibition water a concentrated surfactant solution comprising surfactant (e.g., in the range of about 30 wt % to about 75 wt %), a lower alcohol such as ethanol (e.g., in the range of about 5 wt % to about 25 wt %) and water (e.g., up to about 65 wt %). For example, one such concentrated surfactant solution has a composition of 50 wt % Nonionic Surfactant PO/EO Block Copolymer Having 20% EO, Capping, 15 wt % ethanol and 35 wt % water. In formulating such concentrated surfactant solutions, the alcohol can be combined with the surfactant before the water is added in order to help prevent gelling. According to one embodiment of the invention, the extractant solution has a solvent content (e.g., a lower alcohol content) less than about 1 wt %, or even less than about 0.5 wt %.

Figure 2:
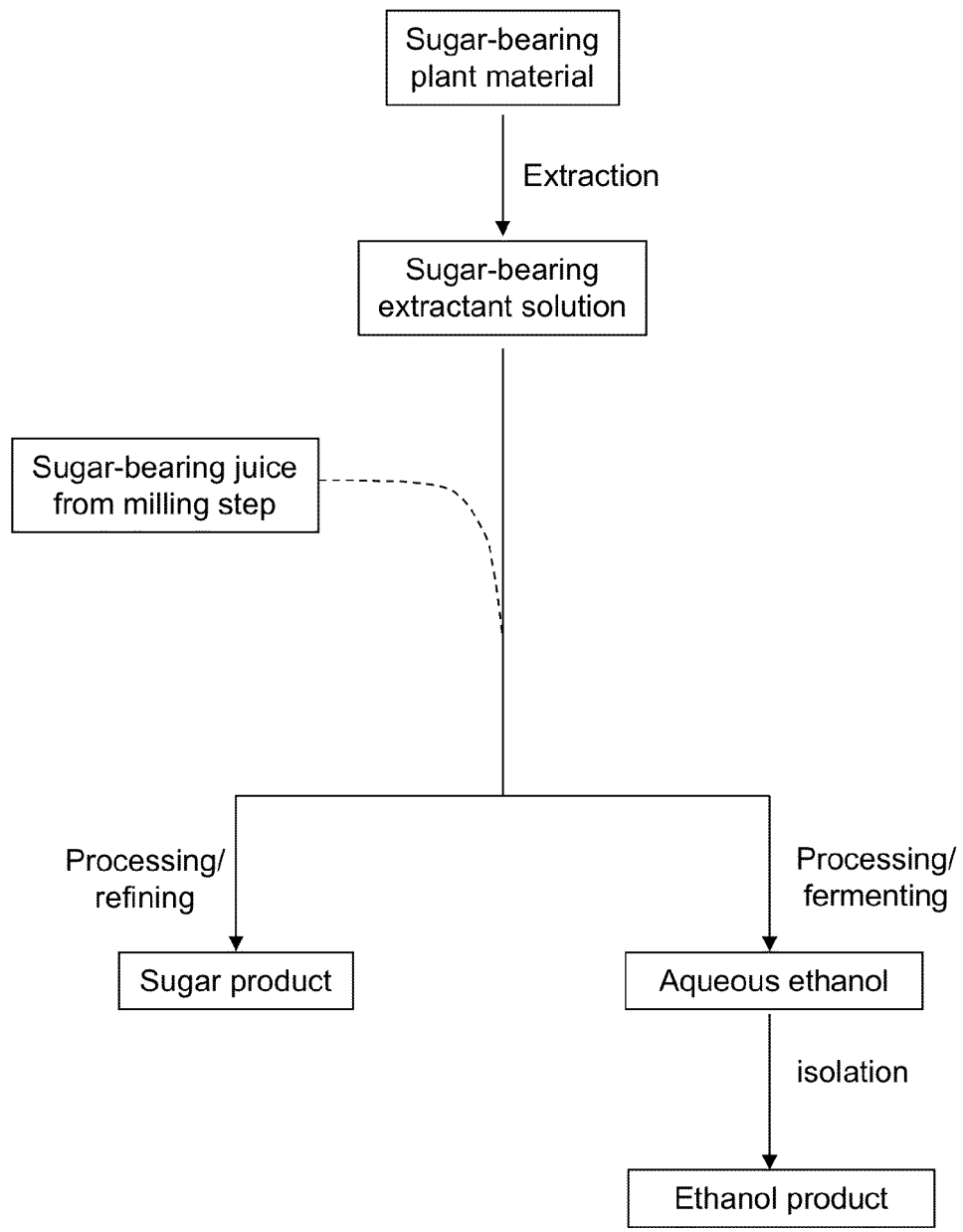
FIG. 2 is a schematic view of sugar and ethanol production process according to one embodiment of the invention.

FIG. 2 depicts the use of an extraction process of the invention in larger sugar production and ethanol production processes. For example, one aspect of the invention is a process for making a sugar product from a sugar-bearing plant material. First, the sugar-bearing plant material is contacted with an extractant solution as described above (e.g., during the milling process as shown in FIG. 1). Then the extractant solution is separated from the sugar-bearing plant material, as described above. The separated sugar-bearing extractant solution is then processed and refined to form a sugar product. The separated extractant solution can be processed and refined on its own, or can alternatively be combined with other liquid sugar cane products (e.g., sugar cane juice from earlier milling steps). Processes for isolating sugar products from sugar cane juice solutions are well known in the art; these processes can be adapted for the isolation of a sugar product from the extractant solution of the invention. An additional embodiment of the invention is a sugar product produced by the process described above.

Another aspect of the invention is a process for making ethanol from a sugar-bearing plant material. First, the sugar-bearing plant material is contacted with an extractant solution, then the extractant solution is separated from the sugar-bearing plant material, as described above. The separated sugar-bearing extractant solution is then processed and fermented (e.g., using conventional methods) to form an aqueous ethanol solution, from which the ethanol is isolated (e.g., by distillation). The separated extractant solution can be processed and fermented on its own, or can alternatively be combined with other liquid sugar cane products (e.g., sugar cane juice from earlier milling steps). Processes for making ethanol from sugar cane juice solutions are well known in the art; these processes can be adapted for the formation of ethanol from the extractant solution of the invention.

EXAMPLES

Example 1

Properties of an Exemplary Surfactant

The sample of Nonionic Surfactant PO/EO Block Copolymer Having 20% EO Capping used in these Examples was determined to have the following physical properties:

Molecular weight: 4050 g/mol, as calculated from the molecular weight of the initiator and the oxide units.
Specific Gravity: 1.024 g/mL at 25° C. as determined using ASTM D 892
Pour point: −8° C. as determined using ASTM D 97
Flash point: >180° C. (open cup), as determined using ASTM D 92
Cloud points: 23° C. at 1% aqueous
   14° C. at 10% aqueous
   49° C. for a solution of 5 g of surfactant in 20 g of a solution of 25% diethylene glycol butyl ether in water
   All cloud points determined using ASTM D 2024
Viscosities: 850 cSt at 25° C.
   386 cSt at 40° C.
   63 cSt at 100° C.
   All viscosities determined using ASTM 445/446

Example 2

Formulation of a Concentrated Surfactant Solution

A concentrated surfactant solution was prepared by combining 15 parts by weight ethanol with 50 parts by weight Nonionic Surfactant PO/EO Block Copolymer Having 20% EO Capping. To this mixture was added 35 parts by weight water. The resulting concentrated surfactant solution had the following properties:

Specific Gravity: 0.9998 g/mL at 25° C. as determined using ASTM D 892

Pour point: −18° C. as determined using ASTM D 97

Flash point: 50° C. (open cup) as determined using ASTM D 92

30° C. (closed cup), as determined using ASTM D 93

Cloud points: 46.2° C. at for 0.5% aqueous solution of the concentrated surfactant solution None determined over the range of 25° C.-90° C. for a solution of 5 g of the concentrated surfactant solution in 20 g of a solution of 25% diethylene glycol butyl ether in water 78.0° C. for a solution of 12.7 g of the concentrated surfactant solution in 11.2 g of 50% aqueous isopropanol All cloud points determined using ASTM D 2024

Viscosities: 203.9 cSt at 25° C.

141.2 cSt at 40° C.

All viscosities determined using ASTM 445/446

Example 3

Extraction of Sugar from Bagasse Samples from Mill #1

Bagasse samples were taken from Mill #1, a sugar cane processing facility in Brazil. At Mill #1, sugar cane material is subjected to six milling steps. Imbibition water is added only in the fifth and sixth milling steps. Samples 1A-1H of fresh bagasse were taken from the output of the fourth milling step, and used in an extraction study.

For each sample, the bagasse (200 g wet weight) was mixed by hand for about two minutes with water (61 g at 50° C.), with different amounts of the concentrated surfactant solution of Example 2 added thereto: 0 ppm (control), 25 ppm, 50 ppm and 100 ppm concentrated surfactant solution, all based on the mass of the water. (100 ppm concentrated surfactant solution is equivalent to about 50 ppm surfactant). The mixtures were pressed in a 125 kgf/cm² press for 1 minute to extract juice. The extracted liquid was analyzed to determine sugar content using standard analytical processes of the sugar cane industry. Total reducing sugars were determined using colorimetric measurements in a copper-based assay. Polarimeter measurements were used as a measure of sucrose content.

Table 1 provides the increase in wt % sucrose in the extracted liquid from the Mill #1 bagasse measured via polarimetry on the extracted liquid.

TABLE 1 wt % increase in sucrose extraction relative to control for bagasse from Mill # 1 for various amounts of concentrated surfactant solution

| Sample | 25 ppm - wt % increase over control | 50 ppm - wt % increase over control | 100 ppm - wt % increase over control |
| --- | --- | --- | --- |
| 1A | — | 7.2 | — |
| 1B | −2.1 | 2.4 | 4.3 |
| 1C | 6.3 | 6.3 | 5.7 |
| 1D | 7.4 | 7.4 | 5.8 |
| 1E | 5.8 | 10.2 | — |
| 1F | 5.8 | 1.6 | — |
| 1G | 10.2 | 12.5 | — |
| 1H | 6.5 | 8.9 | — |

Table 2 provides the increase in wt % total reducing sugar in the extracted liquid from the Mill #1 bagasse measured via a copper-based colorimetric assay on the extracted liquid.

TABLE 2 wt % increase in total reducing sugar extraction relative to control for bagasse from Mill # 1 for various amounts of concentrated surfactant solution

| Sample | 25 ppm - wt % increase over control | 50 ppm - wt % increase over control | 100 ppm - wt % increase over control |
| --- | --- | --- | --- |
| 1A | — | 7.6 | — |
| 1B | −0.9 | 2.3 | 5.1 |
| 1C | 7.7 | 7.5 | 5.4 |
| 1D | 7.3 | 8.7 | 6.3 |
| 1E | 5.5 | 11.4 | — |
| 1F | 5.1 | 2.7 | — |
| 1G | 10.0 | 12.9 | — |
| 1H | 5.6 | 8.2 | — |

Example 4

Extraction of Sugar from Bagasse Samples from Mill #2

Bagasse samples were taken from Mill #2, another sugar cane processing facility in Brazil. At Mill #2, sugar cane material is subjected to six milling steps. Imbibition water is added only in the sixth milling step. Samples A-D of fresh bagasse were taken from the output of the fifth milling step, and used in an extraction study.

For each sample, the bagasse (200 g wet weight) was mixed by hand for about two minutes with water (200 g at 40° C.), with different amounts of the concentrated surfactant solution of Example 2 added thereto: 0 ppm (control), 25 ppm, 50 ppm and 100 ppm concentrated surfactant solution, all based on the mass of the water. The mixtures were pressed in a 250 kgf/cm² press for 1 minute to extract juice. The extracted liquid was analyzed to determine sugar content using standard analytical processes of the sugar cane industry. Total reducing sugars were determined using colorimetric measurements in a copper-based assay. Polarimeter measurements were used as a measure of sucrose content.

Table 3 provides the increase in wt % sucrose in the extracted liquid from the Mill #2 bagasse measured via polarimetry on the extracted liquid.

TABLE 3 wt % increase in sucrose extraction relative to control for bagasse from Mill # 2 for various amounts of concentrated surfactant solution

| Sample | 25 ppm - wt % increase over control | 50 ppm - wt % increase over control | 100 ppm - wt % increase over control |
|---|---|---|---|
| 2A | 1.0 | 2.5 | −2.3 |
| 2B | −0.5 | 2.5 | 0.5 |
| 2C | 1.0 | 2.3 | 1.3 |
| 2D | 2.8 | 3.6 | 2.5 |

Table 4 provides the wt % increase in total reducing sugar in the extracted liquid from the Mill #2 bagasse measured via a copper-based colorimetric assay on the extracted liquid.

TABLE 4 wt % increase in total reducing sugar extraction relative to control for bagasse from Mill # 2 for various amounts of concentrated surfactant solution

| Sample | 25 ppm - wt % increase over control | 50 ppm - wt % increase over control | 100 ppm - wt % increase over control |
|---|---|---|---|
| 2A | 0.1 | 0.4 | −1.1 |
| 2B | 0.9 | 4.0 | 5.4 |
| 2C | 0.4 | 1.4 | 0.0 |
| 2D | 0.6 | 2.8 | 1.4 |

It will be apparent to those skilled in the art that various modifications and variations can be made to the invention without departing from the scope of the invention. Thus, it is intended that the invention cover the modifications and variations of this invention provided they come within the scope of the appended claims and their equivalents.

What is claimed is:

1. A process for extracting sugar from sugar-bearing plant material, the process comprising:
   contacting the sugar-bearing plant material with an extractant solution comprising water, an organic solvent, and a surfactant; and
   separating the extractant solution from the sugar-bearing plant material,
   wherein the sugar-bearing plant material is from the grass family,
   wherein the surfactant is a poly(alkylene oxide) copolymer and has ethylene oxide units in the range of about 5 wt % to about 85 wt % of formula (I):

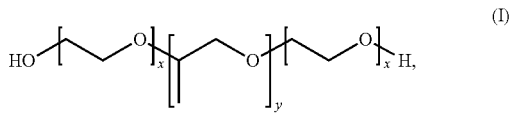

in which each of x and y are greater than zero, and
   wherein the surfactant is used to increase extraction efficiency.

2. The process of claim 1, wherein the extractant solution further comprises sugar bearing plant material juice.

3. The process of claim 1, wherein the sugar-bearing plant material is sugar cane material.

4. The process of claim 3, wherein the sugar cane material is sugar cane bagasse.

5. The process of claim 1, further comprising grinding, milling, chopping, pulping, shredding or macerating the sugar-bearing plant material before contacting it with the extractant solution.

6. The process of claim 1, wherein the sugar-bearing plant material is ground, milled, chopped, pulped, shredded or macerated while it is being contacted with the extractant solution.

7. The process of claim 1, further comprising grinding, milling, chopping, pulping, shredding or macerating the sugar-bearing plant material before contacting it with the extractant solution, and wherein the sugar-bearing plant material is ground, milled, chopped, pulped, shredded or macerated while it is being contacted with the extractant solution.

8. The process of claim 1, wherein the surfactant is present in the extractant solution at a concentration in the range of about 0.2 ppm to about 1000 ppm based on the mass of the extractant solution.

9. The process of claim 1, wherein the surfactant is present in the extractant solution at a concentration in the range of about 0.5 ppm to about 500 ppm based on the mass of the extractant solution.

10. The process of claim 1, wherein the surfactant is a nonionic surfactant.

11. The process of claim 1 wherein the surfactant has a number average molecular weight of at least about 1500 g/mol.

12. The process of claim 1 wherein the surfactant has a number average molecular weight of at least about 3000 g/mol.

13. The process of claim 1 wherein the surfactant has a functionality of OH capping groups of at least about 1.5.

14. The process of claim 1, wherein the surfactant has ethylene oxide units in the range of about 10 wt % to about 40 wt %.

15. The process of claim 1, wherein the surfactant is an α-Hydro-omega-hydroxy-poly(oxyethylene)/poly(oxypropylene) (minimum 15 moles/poly(oxyethylene)) block copolymer, having a minimum average molecular weight of 1900 g/mol and a minimum cloud point of 9° C.-12° C. in 10 percent aqueous solution.

16. The process of claim 1, wherein the surfactant is a block copolymer of structural formula (I) having an average molecular weight in the range of about 3800 g/mol to about 4200 g/mol and about 20 wt % ethylene oxide units.

17. A process for making a sugar product from a sugar-bearing plant material, the process comprising:
   extracting sugar from the sugar-bearing plant material as described in claim 1 to form a sugar-bearing extractant solution; and
   processing and refining the extractant solution to form the sugar product.

18. A process for making ethanol from a sugar-bearing plant material, the process comprising:
   extracting sugar from the sugar-bearing plant material as described in claim 1 to form a sugar-bearing extractant solution;
   processing and fermenting the sugar-bearing extractant solution to form an aqueous ethanol solution; and
   isolating the ethanol from the aqueous ethanol solution.

* * * * *